US010693856B2

(12) United States Patent
Cox, Jr. et al.

(10) Patent No.: US 10,693,856 B2
(45) Date of Patent: Jun. 23, 2020

(54) AUTOMATIC AUTHENTICATION SWITCHING IN ONLINE LIVE CHAT APPLICATIONS

(71) Applicant: FMR LLC, Boston, MA (US)

(72) Inventors: Richard Elliott Cox, Jr., Lantana, TX (US); Robert S. Campbell, Attleboro, MA (US); Ryan Hightower, Roanoke, TX (US); Ramakrishnan Balachandran, Fort Worth, TX (US); Mena Gerges, Fort Worth, TX (US)

(73) Assignee: FMR LLC, Boston, MA (US)

( * ) Notice: Subject to any disclaimer, the term of this patent is extended or adjusted under 35 U.S.C. 154(b) by 217 days.

(21) Appl. No.: 15/672,203

(22) Filed: Aug. 8, 2017

(65) Prior Publication Data

US 2019/0052616 A1    Feb. 14, 2019

(51) Int. Cl.
*H04L 29/06* (2006.01)
*H04L 29/08* (2006.01)
*H04L 12/58* (2006.01)

(52) U.S. Cl.
CPC ............ *H04L 63/08* (2013.01); *H04L 51/046* (2013.01); *H04L 51/06* (2013.01); *H04L 63/105* (2013.01); *H04L 65/1069* (2013.01); *H04L 65/1083* (2013.01); *H04L 65/403* (2013.01); *H04L 67/141* (2013.01); *H04L 67/145* (2013.01); *H04L 67/306* (2013.01); *H04L 51/18* (2013.01); *H04L 67/02* (2013.01)

(58) Field of Classification Search
CPC ....... H04L 63/08; H04L 51/046; H04L 51/06; H04L 63/105; H04L 63/1069; H04L 63/1083; H04L 63/403
See application file for complete search history.

(56) References Cited

U.S. PATENT DOCUMENTS

| | | | |
|---|---|---|---|
| 9,077,699 B1* | 7/2015 | James | H04L 63/08 |
| 9,306,930 B2 | 4/2016 | Keys et al. | |
| 9,473,534 B2* | 10/2016 | Brander | H04L 63/20 |
| 2004/0061718 A1* | 4/2004 | Fitzpatrick | H04L 51/04 |
| | | | 715/758 |
| 2012/0185561 A1 | 7/2012 | Klein et al. | |
| 2016/0189147 A1* | 6/2016 | Vanczak | G06Q 20/32 |
| | | | 705/71 |
| 2018/0137504 A1* | 5/2018 | Goldenberg | G06Q 20/085 |

* cited by examiner

*Primary Examiner* — James R Sheleheda
*Assistant Examiner* — Franklin S Andramuno
(74) *Attorney, Agent, or Firm* — Proskauer Rose LLP

(57) ABSTRACT

Methods and apparatuses are described for automatic authentication switching in online chat sessions. A server receives a request to establish an online chat session from a first client device, including authentication credentials associated with the first client device. The server establishes an online chat session between the first client device and a second client device via a first authenticated communications channel. The server transmits one or more chat messages between the first client device and the second client device using the first authenticated communications channel. The first client device determines that the online chat session has lost authentication. The first client device automatically switches the online chat session to a second unauthenticated communications channel. The server maintains the established online chat session between the first client device and the second client device via the second unauthenticated communications channel.

25 Claims, 5 Drawing Sheets

AUTOMATIC AUTHENTICATION SWITCHING IN ONLINE LIVE CHAT APPLICATIONS

TECHNICAL FIELD

This application relates generally to methods and apparatuses, including computer program products, for automatic authentication switching in online live chat applications.

BACKGROUND

Data security and privacy in computing systems is of utmost concern to many companies and enterprises. With many points of access into such enterprise computing systems, it is crucial for these systems to have the capability to authenticate remote users and computing devices that establish connections to the enterprise systems and, once connected, to ensure that a secure, authenticated connection is maintained throughout the duration of a communication session. For example, many companies offer online text chat applications on their websites that enable users at remote computing devices to connect via the internet with, e.g., a computing resource operated by a service representative to establish a live chat session with the representative to obtain information and other services—including potentially sensitive or secure data—from the company. Such chat sessions are typically secured by authenticating the remote computing device and/or user (e.g., using electronic credentials) prior to or at the same time as the communication session is established and the authentication persists throughout the session. One example of such authentication is a user logging into a secure website and then accessing a chat application to establish a connection with a chat service of the company that operates the website. In such an example, the chat application can automatically import the authentication credentials from the website session to the chat application (e.g., so that the user does not need to re-enter authentication credentials).

In certain circumstances, the authentication of the chat session can be lost—e.g., due to the user logging out of the secured website, due to the expiration of authentication credentials, due to page navigation that changes the user's authentication status, and the like—but the chat session itself continues. In these scenarios, the representative is typically not aware that the chat session is no longer authenticated and the representative may erroneously continue to provide secured or sensitive information to the user despite the lack of proper authentication. In another example, when authentication of the chat session is lost, the enterprise computing resource can simply disconnect the chat session abruptly without advising the representative or the user. As a result, the user must then establish a new chat session and re-authenticate to the enterprise system, resulting in an additional computing resource burden on the enterprise system and delays in the chat session.

SUMMARY

Therefore, methods and systems are needed for automatically switching authentication levels during an online chat session to enable the continued use of the chat session during periods that the chat session is unauthenticated, while avoiding the unauthorized disclosure of sensitive or restricted information until the chat session is re-authenticated. The techniques described herein provide the advantage of enabling seamless re-authentication of a client device after any of a number of technical interruptions to the session and/or the authentication credentials, including expired authentication, closed authentication, failure of security policy checks in the authentication policy monitor. The client device retains the chat history, the chat state, and the a connection to the same remote computing device, essentially resulting in an unimpaired and uninterrupted chat session.

The invention, in one aspect, features a computerized method of automatic authentication switching in online chat sessions. A server computing device receives a request to establish an online chat session from a first client computing device, the request including authentication credentials associated with the first client computing device. The server computing device establishes an online chat session between the first client computing device and a second client computing device via a first authenticated communications channel after validating the authentication credentials. The server computing device transmits one or more chat messages between the first client computing device and the second client computing device using the first authenticated communications channel. The first client computing device determines that the online chat session has lost authentication. The first client computing device automatically switches the online chat session to a second unauthenticated communications channel. The server computing device maintains the established online chat session between the first client computing device and the second client computing device via the second unauthenticated communications channel.

The invention, in another aspect, features a system for automatic authentication switching in online chat sessions. The system comprises a server computing device, a first client computing device, and a second client computing device. The server computing device receives a request to establish an online chat session from the first client computing device, the request including authentication credentials associated with the first client computing device. The server computing device establishes an online chat session between the first client computing device and the second client computing device via a first authenticated communications channel after validating the authentication credentials. The server computing device transmits one or more chat messages between the first client computing device and the second client computing device using the first authenticated communications channel. The first client computing device determines that the online chat session has lost authentication. The first client computing device automatically switches the online chat session to a second unauthenticated communications channel. The server computing device maintains the established online chat session between the first client computing device and the second client computing device via the second unauthenticated communications channel.

The invention, in another aspect, features a computer program product, tangibly embodied in a non-transitory computer readable storage device, for automatic authentication switching in online chat sessions. The computer program product includes instructions that, when executed, cause a server computing device to receive a request to establish an online chat session from the first client computing device, the request including authentication credentials associated with the first client computing device. The computer program product includes instructions that, when executed, cause the server computing device to establish an online chat session between the first client computing device and the second client computing device via a first authenticated communications channel after validating the authentication credentials. The computer program product includes instructions that, when executed, cause the server computing device to transmit one or more chat messages between the first client computing device and the second client computing device using the first authenticated communications channel. The computer program product includes instructions that, when executed, cause the first client computing device to determine that the online chat session has lost authentication. The computer program product includes instructions that, when executed, cause the first client computing device to automatically switch the online chat session to a second unauthenticated communications channel. The computer program product includes instructions that, when executed, cause the server computing device to maintain the established online chat session between the first client computing device and the second client computing device via the second unauthenticated communications channel.

Any of the above aspects can include one or more of the following features. In some embodiments, the server computing device prevents one or more chat messages from being transmitted between the first client computing device and the second client computing device via the first authenticated communications channel when the server computing device determines that the online chat session has lost authentication. In some embodiments, the one or more chat messages prevented from being transmitted between the first client computing device and the second client computing device via the first authenticated communications channel contain sensitive information.

In some embodiments, the first authenticated communications channel comprises a first URL that, when activated, connects the first client computing device to the second client computing device via an authentication module at the server computing device. In some embodiments, the first URL includes an in-line customer identifier. In some embodiments, the second unauthenticated communications channel comprises a second URL that, when activated, connects the first client computing device to the second client computing device via the server computing device without using an authentication module. In some embodiments, the step of automatically switching the online chat session comprises transferring the online chat session from the first authenticated communications channel to the second unauthenticated communications channel and then closing the first authenticated communications channel.

In some embodiments, the step of determining that the online chat session has lost authentication comprises one or more of: determining that a browser at the first client computing device has logged out of a secure website; determining that authentication associated with the online chat session has expired; and determining that a browser at the first client computing device has navigated away from a secure website. In some embodiments, the first client computing device determines that the online chat session has lost authentication upon receiving an authentication error from the server computing device. In some embodiments, the first client computing device generates an authentication loss chat message by appending an authentication loss trigger to a chat message and sends the authentication loss chat message to the server computing device. In some embodiments, the second client computing device generates an authentication loss chat message by appending an authentication loss trigger to a chat message and sends the authentication loss chat message to the server computing device.

In some embodiments, the server computing device generates a blank authentication credential upon receiving the authentication loss chat message, and transmits the blank authentication credential to the second client computing device. In some embodiments, the second client computing device generates a visual indicator on a display coupled to the second client computing device, the visual indicator instructing a user of the second client computing device that the online chat session has lost authentication.

In some embodiments, the server computing device instructs the first client computing device to resend the authentication credentials upon determining that the online chat session has lost authentication, automatically switches the online chat session from the second unauthenticated communications channel to the first authenticated communications channel upon validating the resent authentication credentials, and maintains the established online chat session between the first client computing device and the second client computing device via the first authenticated communications channel.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
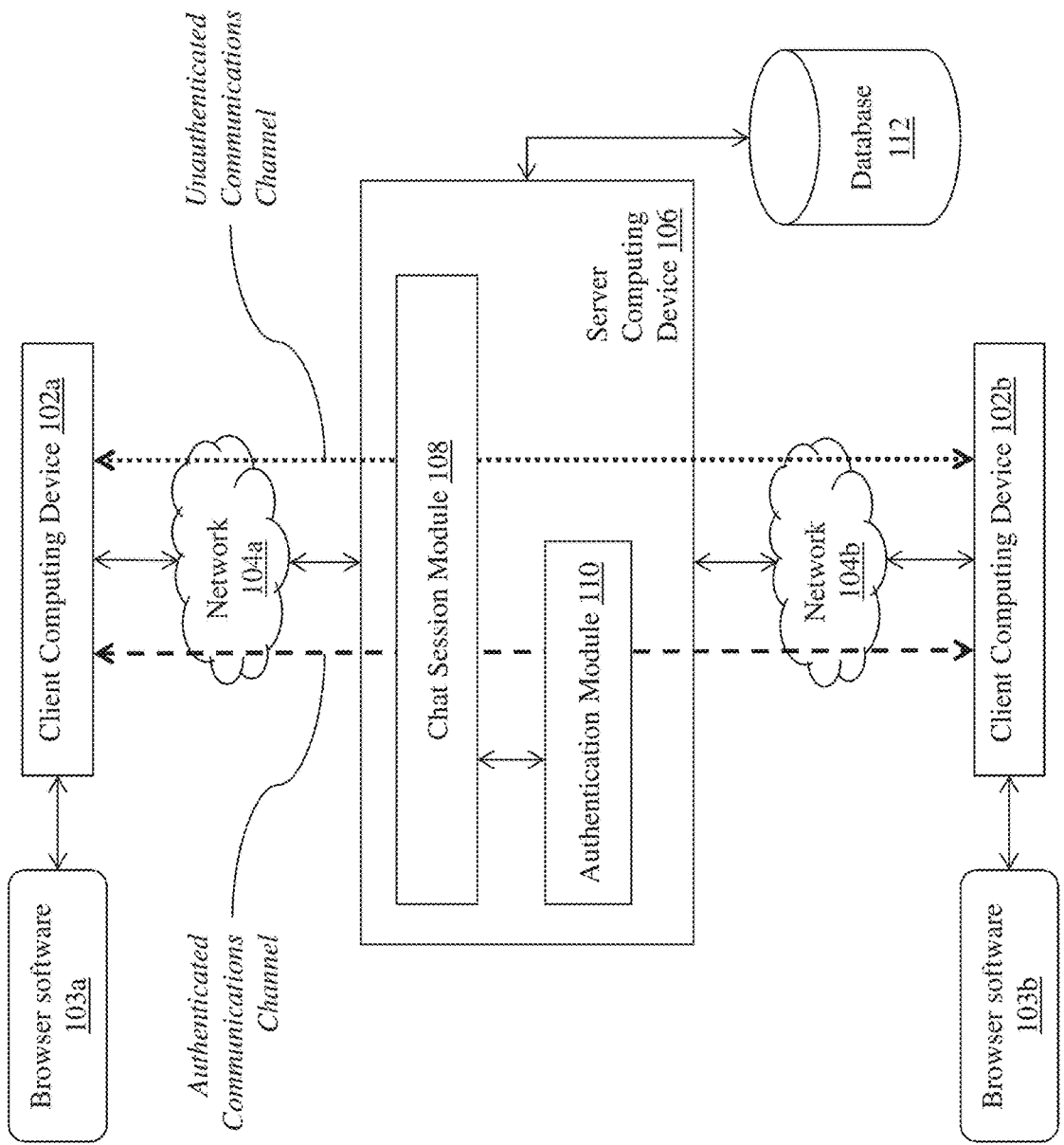
FIG. 1 is a block diagram of a system for automatic authentication switching in online chat sessions.

FIG. 1 is a block diagram of a system 100 for automatic authentication switching in online chat sessions. The system 100 includes a client computing devices 102a, 102b, display devices 103a, 103b, communications networks 104a, 104b, a server computing device 106 with a chat session module 108 and an authentication module 110, and a database 112.

As shown in FIG. 1, each client computing device 102a, 102b is coupled to a corresponding display device 103a, 103b (e.g., a screen/monitor) and a corresponding communication network 104a, 104b that enable the respective client computing devices 102a, 102b to communicate with the server computing device 106 for the purpose of establishing an online chat session and exchanging chat messages as will be described herein.

Each client computing device 102a, 102b uses software and circuitry (e.g., a processor, memory) to execute applications and to communicate with the server computing device 106 (e.g., using browser software installed on the device to connect to the networks 104a, 104b). Example client computing devices 102a, 102b can include, but are not limited to, a desktop computer, laptop computer, tablet, smart phone (e.g., Apple iPhone®, Windows®, and/or Android™-based device), other mobile device or similar types of computing devices.

The communication networks 104a, 104b enable components of the system 100 to communicate with each other using, e.g., any of a number of different communications protocols. One example of such a communications protocol is a packet-based protocol such as Internet Protocol (IP). The networks 104a, 104b may be a local network, such as a LAN, or a wide area network, such as the Internet. In some embodiments, the networks 104a, 104b are comprised of several discrete networks and/or sub-networks (including related routing, load balancing, and traffic metering hardware).

The server computing device 106 is a combination of hardware and software modules that includes specialized hardware and/or software modules that execute on a processor and interact with memory modules of the server computing device 106, to receive data from the database 112, to transmit data to the database 112, and to communicate with the other devices of the system 100 (e.g., client devices 102a, 102b) in order to perform functions for establishing an online chat session and exchanging chat messages between the client devices and also automatic authentication switching in said online chat sessions, as described herein. The server computing device 106 includes a chat session module 108 and an authentication module 110 that execute on and/or interact with the processor of the server computing device 106.

In some embodiments, the chat session module 108 and the authentication module 110 are specialized sets of computer software instructions programmed onto one or more dedicated processors in the server computing device 106 and can include specifically-designated memory locations and/or registers for executing the specialized computer software instructions. Although the chat session module 108 and the authentication module 110 are shown in FIG. 1 as executing within the same server computing device 106, in some embodiments the functionality of the chat session module 108 and the authentication module 110 can be distributed among a plurality of server computing devices. As shown in FIG. 1, the server computing device 106 enables the chat session module 108 and the authentication module 110 to communicate with each other in order to exchange data for the purposes of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the chat session module 108 and the authentication module 110 is described in detail below.

The chat session module 108 communicates with the client computing devices 102a, 102b in order to establish an online chat session and exchange chat messages between the respective client devices as described herein. In some embodiments, the chat session module 108 interacts with browser software installed on the client devices to generate a graphical user interface containing the exchanged chat messages that is displayed on the display 103a, 103b associated with the respective client computing devices, and receives actions (e.g., input of user-defined text, interaction with user interface elements, and the like) performed in the browser software on the client devices 101 which are transmitted back to the server computing device 106 for facilitating the online chat session.

The authentication module 110 communicates with the chat session module 108 to receive authentication credentials (e.g., as passed from the client computing device 102a) and to authenticate a user of client device 102a using the authentication credentials, so that the chat session module 108 can utilize the authenticated communications channel to exchange chat messages between the client devices 102a, 102b, as will be described in greater detail below.

The database 112 is a computing device (or in some embodiments, a set of computing devices) coupled to the server computing device 106 and is configured to receive, generate, and store specific segments of data relating to the process of establishing an online chat session and exchanging chat messages between the client devices and also automatic authentication switching in said online chat sessions as described herein. In some embodiments, all or a portion of the database 112 can be integrated with the server computing device 106 or be located on a separate computing device or devices. The database 112 can comprise one or more databases configured to store portions of data used by the other components of the system 100, as will be described in greater detail below. An exemplary database 108 is MySQL™ available from Oracle Corp. of Redwood City, Calif.

Figure 2:
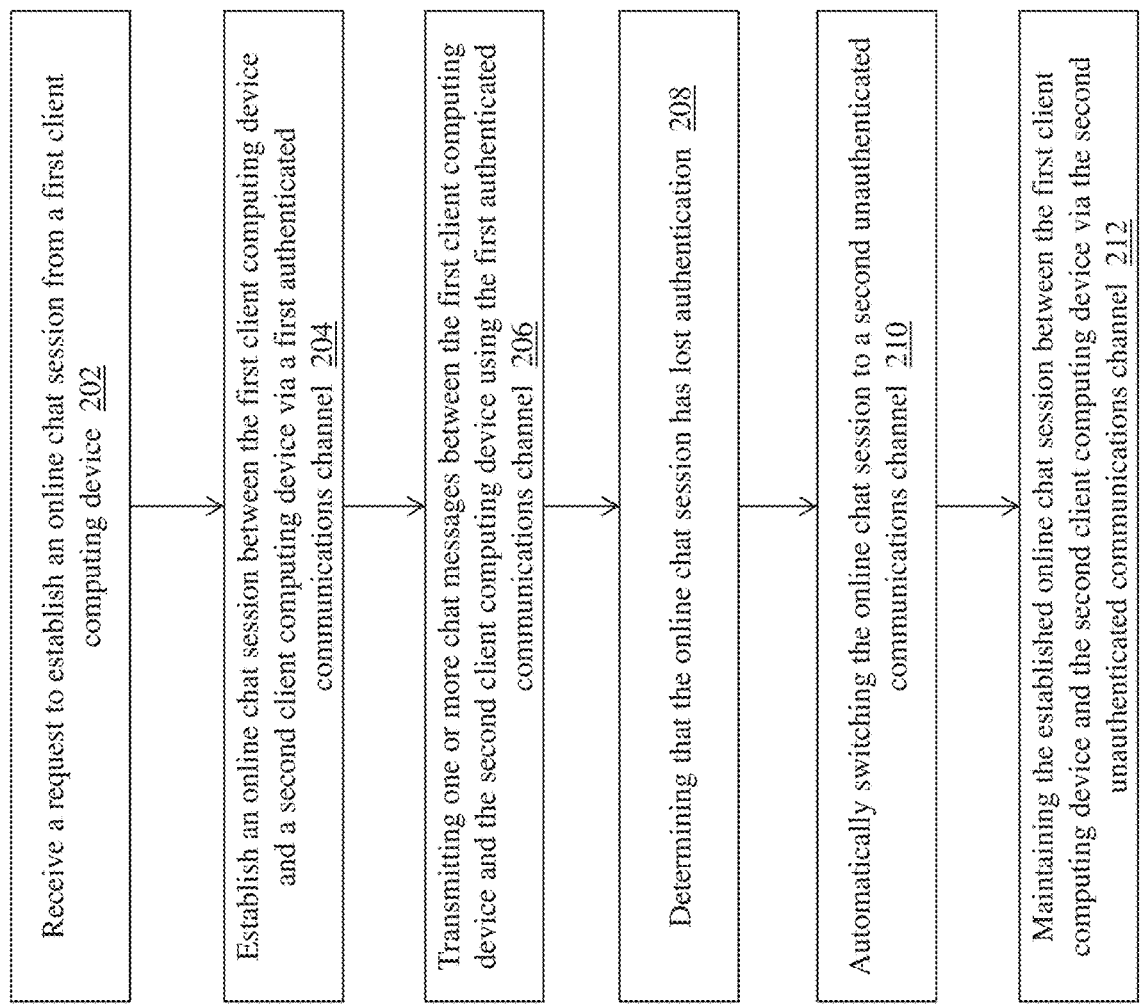
FIG. 2 is a flow diagram of a method of automatic authentication switching in online chat sessions.

FIG. 2 is a flow diagram of a method 200 of automatic authentication switching in online chat sessions, using the system 100 of FIG. 1. The chat session module 108 of server computing device 106 receives (202) a request to establish an online chat session from a first client computing device 102a. The request includes authentication credentials (e.g., username and password, token, cookie, key, PIN, or other types of authentication information) associated with the first client computing device 102a. In some embodiments, the authentication credentials include one or more characteristics of the first client computing device (e.g., device ID, IP address, MAC address, etc.) and one or more characteristics of a user of the first client computing device (e.g., account name, account number, user ID and the like).

In some embodiments, the request to establish an online chat session occurs after the client device 102a has connected to a secure website (e.g., hosted by server computing device 106) and provided authentication credentials to the secure website. For example, the server computing device 106 can store the authentication credentials in, e.g., database 112 and associate them with the client device and/or a communications session for the client device 102a. Then, when the client device 102a initiates a subsequent request to establish an online chat session with the second client computing device 102b, the server computing device 106 can either retrieve the authentication credentials and pass them to the chat session module 108, or indicate to the chat session module 108 that the client device 102a is already authenticated. In this instance, the chat session module 108 does not need to conduct a separate authentication routine, but instead inherits the authentication credentials established by the host website.

The chat session module 108 establishes (204) an online chat session between the first client computing device 102a and a second client computing device 102b via a first authenticated communications channel (as shown in FIG. 1) after validating the authentication credentials received as part of the chat session request. In one embodiment, the chat session module 108 passes the authentication credentials to the authentication module 110, which then issues one or more queries to database 112 to retrieve information from database 112 that validates the authentication credentials. The authentication module 110 can use the authentication credentials to look up a user record and/or client device record in database 112 to confirm that the user/client device is known to the server computing device 106 and is authorized to receive sensitive information from the second client computing device 102*b* during the online chat session. For example, a user at the second client computing device 102*b* may have sensitive information (e.g., personal data, financial data, privacy-related data) that the user at the first client computing device 102*a* wishes to access or receive. In order for the user at the second client computing device 102*b* to properly release the sensitive information, the chat session module 108 must authenticate the user/client device 102*a* so that the authenticated communications channel can be used to connect the client computing devices 102*a*, 102*b* for the online chat session.

As shown in FIG. 1, once the authentication credentials are validated, the chat session module 108 establishes the online chat session that connects the first client computing device 102*a* and the second client computing device 102*b* via the authenticated communications channel that connects the client devices 102*a*, 102*b* through the chat session module 108 and the authentication module 110. In some embodiments, the chat session module 108 and/or the authentication module 110 can periodically validate that the online chat session is still authenticated by automatically requesting authentication credentials from the first client computing device 102*a* and validating the credentials. In some embodiments, the chat session module 108 and/or the authentication module 110 can periodically validate that the online chat session is still authenticated by examining the contents of one or more packets that comprise the online chat session to identify one or more characteristics of the packets that indicate the session is authenticated (e.g., a URL being used to facilitate the online chat session, a flag or other similar data item in the packets that refers to authentication status, and the like).

During the online chat session, the first client computing device 102*a* and the second client computing device 102*b* exchange chat messages (e.g., one or more packets that include textual communications) that are transmitted through the server computing device 106 via the authenticated communications channel. Certain circumstances can arise during the online chat session, which cause the session to lose authentication. The client computing device 102*a* determines (208) that the online chat session has lost authentication. In some embodiments, the client computing device 102*a* recognizes and reacts to changes that occur in the authentication status of the secure website to which the client device 102*a* previously authenticated and the client device 102*a* adjusts the authentication status of the online chat session based upon the changes that occurred at the secure website.

In one example, the client device 102*a* can determine that browser software at the first client computing device 102*a* has logged out of or navigated away from a secure website. In this example, the user at the first client computing device 102*a* may have navigated to a secure website with a browser on the client device 102*a*, and logged in using authentication credentials to gain access to certain functionality and/or information on the website that pertains to the user. After logging in, the user at client device 102*a* can request to establish an online chat session (e.g., by clicking a button that launches a chat session in a separate pop-up window from the main browser window) to ask questions or to gain additional information. The chat session module 108 establishes the online chat session, and the main browser window that is connected to the secure website remains available and authenticated. However, the user at client device 102*a* may close the main browser window, log off from the secure website in the main browser window and/or navigate away from the secure website in the main browser window, thereby disconnecting the client device from the secure website and, as such, the client device 102*a* can determine that the authentication is no longer present and thus the online chat session has lost authentication.

In another example, the online chat session may be idle (e.g., no messages being exchanged between the client devices 102*a*, 102*b*) for a certain period of time and the authentication credentials or parameters associated with the online chat session may become stale and/or expire. In some instances, the authentication credentials can be time-limited, so that they are associated with, e.g., a timestamp after which point they are considered no longer valid and must be re-established. In this case, the client device 102*a* can determine that the authentication is no longer present and thus the online chat session has lost authentication. It should be appreciated that in addition to the above, other mechanisms or techniques for determining that the online chat session has lost authentication can be utilized with the systems and methods described herein.

Upon determining that the online chat session has lost authentication, the client computing device 102*a* automatically switches (210) the online chat session to a second unauthorized communications channel (as shown in FIG. 1). In some embodiments, the client computing device 102*a* establishes a second connection to the chat session module 108 of server computing device 106 and maintains the online chat session using the second connection. In this case, the second connection is a communications channel that has not been authenticated by the authentication module 110 (e.g., the client device 102*a* has not re-transmitted authentication credentials for validation by the server computing device 106). For example, the client device 102*a* can redirect browser software 103*a* (e.g., the pop-up window that contains the online chat session) to a different URL than the URL being used for the authenticated communications channel. In another example, the client device 102*a* can update one or more data elements in the packets being exchanged with the chat session module 108 of server computing device 106 to indicate that the packets are not authenticated. Upon generating a packet that contains the updated data element, the browser software at, e.g., client device 102*a* can automatically switch to an unauthenticated communications channel and submits subsequent messages using the unauthenticated channel. It should be appreciated that the authenticated communications channel and the unauthenticated communications channel can be configured as physical channels (e.g., a specific series of physical network paths and devices over which the chat session messages are routed) and/or as logical channels (e.g., a communications path that is designated as authenticated or unauthenticated using any of a number of different techniques).

Once the client device 102*a* has switched the online chat session from the first authenticated communications channel to the second unauthenticated communications channel using the chat session module 108, the module 108 maintains (212) the established online chat session between the client computing device 102*a* and the client computing device 102*b* via the second unauthenticated communications channel. In some embodiments, the automatic switching of the online chat session from authenticated channel to unauthenticated channel happens seamlessly, and the client devices 102a, 102b can continue with the established online chat session (e.g., the session is not broken, thereby avoiding any requirement that the client devices 102a, 102b establish an entirely new session or risking that any communications sent between the devices are lost).

In some embodiments, the client computing devices 102a, 102b receive an indication from the chat session module 108 that the online chat session is no longer authenticated. For example, in one embodiment the chat session module 108 can transmit an authentication error and/or authentication loss chat message (generated by appending an authentication loss trigger to a chat message) to the client computing device 102a, 102b, which can cause the display 103a, 103b associated with the respective client devices to render a visual indicator (e.g., a red border around the chat window, a text message, and the like) to indicate to the respective users of the devices that the session is not authenticated. As a result, the users at the client devices 102a, 102b can refrain from sending any sensitive or confidential information via the chat session until the session can be re-authenticated.

As previously explained, to establish an authenticated online chat session, user at client computing device 102a launches browser software 103a and navigates to a website (e.g., by entering a URL into the browser 103a) hosted by the server computing device 106. The user logs into the website by submitting authentication credentials, such as a username and password, and establishes a secure connection to the website. Once the client device 102a is securely connected to the website, a user at client device 102a can submit a request 302 to establish an online chat session (e.g., by clicking a link or button on the secure website) to the chat session module. In some embodiments, the request includes authentication credentials (e.g., the authentication credentials previously submitted by the user to log into the secure website). In some embodiments, the authentication credentials are already stored at the server computing device 106 and the chat session module 108 adopts the authentication credentials from the server computing device 106.

The request to establish the online chat session is submitted from the browser 103a of the client device 102a to the chat session module 108. In one embodiment, the online chat session established by the chat session module 108 uses AJAX Restful service calls in order to transmit and receive messages as part of the chat session. In this embodiment, the chat session module 108 uses two different communications channels—one channel for authenticated AJAX Restful calls and another channel for unauthenticated calls. To identify which communications channel the online chat session is using, the browser 103a at client device 102a can use different URLs—for example, if the URL endpoint that the browser 103a is using contains a particular string (e.g., "customer" as in https://www.xyz.com/chat/customer/...), then that URL denotes the authenticated communications channel and the online chat session must pass through the authentication module 110 in order to validate the authentication credentials. And, if the URL endpoint that the browser 103a is using contains a different string (e.g., "guest" as in https://www.xyz.com/chat/guest/...), then that URL denotes the unauthenticated channel and the online chat session does not need to pass through the authentication module 110.

Thus, if the user has previously authenticated to the secure website, the browser 103a issues AJAX Restful calls that request an online chat session to the chat session module 108 using the URL with the authenticated URL endpoint string (e.g., "customer") and the chat session module 108 in conjunction with the authentication module 110 validates (304) the authentication credentials. In this instance, once the credentials are validated, the chat session module 108 connects to the client device 102b (e.g., using browser software 103b) and establishes (306) the online chat session using the URL with the authenticated URL endpoint.

In some embodiments, the client device 102b uses particular online chat software and functionality to communicate with the server computing device 106, such as the Genesys® Chat system available from Genesys Telecommunications Laboratories, Inc. of Daly City, Calif.

As mentioned above, certain events or circumstances can arise during the online chat session that can cause the session to lose authentication. When authentication is lost, the systems and methods described herein advantageously provide a mechanism for automatically switching the online chat session from an authenticated channel to an unauthenticated channel so that (i) the online chat session can seamlessly continue, avoiding a dropped session or asking the client devices 102a, 102b to establish an entirely new session and (ii) the users at client devices 102a, 102b can be alerted to the loss of authentication and refrain from submitting sensitive information in the online chat session. There are two different points during an online chat session at which the session may lose authentication: 1) when a user at client device 102a submits a message to the client device 102b via the chat session module 108, and 2) when a user at client device 102b submits a message to the client device 102a via the chat session module 108. The following figures provide detailed workflow diagrams for each of these scenarios.

Figure 3:
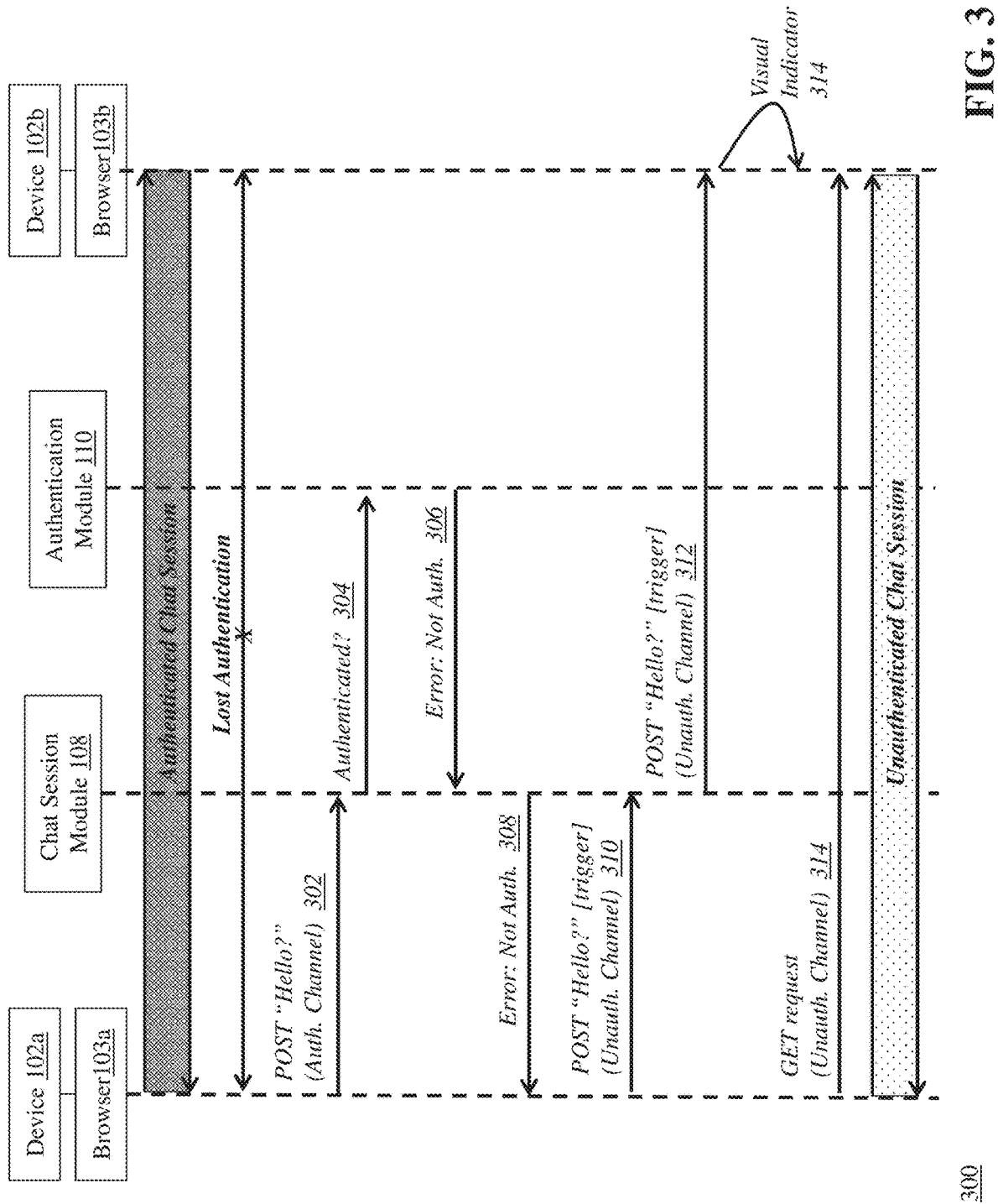
FIG. 3 is a detailed ladder diagram of a method of automatic authentication switching from an authenticated channel to an unauthenticated channel in an online chat session.

FIG. 3 is a detailed ladder diagram of a method 300 of automatic authentication switching from an authenticated channel to an unauthenticated channel in an online chat session, using the system 100 of FIG. 1, when a user at client device 102a submits a message during the online chat session. It should be appreciated that software (e.g., browser 103a) at client device 102a has previously established an online chat session with software (e.g., browser 103b) at client device 102b using an authenticated channel (e.g., https://www.xyz.com/chat/customer/...URL) via chat session module 108 and authentication module 110. During the online session, browser 103a periodically polls the chat session module 108 to determine if any messages have been received from client device 102b. At the same time, user at client device 102a can submit his or her own chat messages via browser 103a (e.g., by entering the message into a user interface window and pressing a submit button, which executes a HTTP POST command to send the message to the chat session module 108 via the authenticated channel).

In the example shown in FIG. 3, client device 102a has input a text message ("Hello?") into the browser 103a and submitted the message (302) via HTTP POST (e.g., {authorRole: "CUSTOMER", type: "CONTENT", content: "Hello?"}) to the chat session module 108 via the authenticated channel. However, the online chat session between client device 102a and client device 102b has lost authentication due to invalid authentication credentials prior to the client device 102a sending the HTTP POST message. The chat session module 108 receives the HTTP POST message and determines (304) from the authentication module 110 that the current session has lost authentication (e.g., the authentication module 110 returns (306) an error message to the chat session module 108). In some embodiments, the error message returned by the authentication module 110 is a JSON error message, such as "{status: 100, reason: "INVALID CREDENTIALS", fsreqid: "REQ999 . . . ", AMReason: "NoFC"}.

The chat session module 108 sends (308) the error message back to the browser 103a at client device 102a. Upon receiving the error message, the browser 103a automatically switches the online chat session to use the unauthenticated channel (e.g., https://www.xyz.com/chat/guest/...URL) and appends a trigger to the HTTP POST message "Hello?" that it previously sent. In some embodiments, the trigger is a data element that provides an indication that authentication of the online chat session is lost. For example, the updated HTTP POST message can be {authorRole: "CUSTOMER", type: "CONTENT", content: "Hello?"; trigger: "AMLOSS"} where "AMLOSS" indicates that authentication is lost. The browser 103a at client device 102a resubmits (310) the updated HTTP POST message to the chat session module 108 via the unauthenticated channel.

Figure 4:
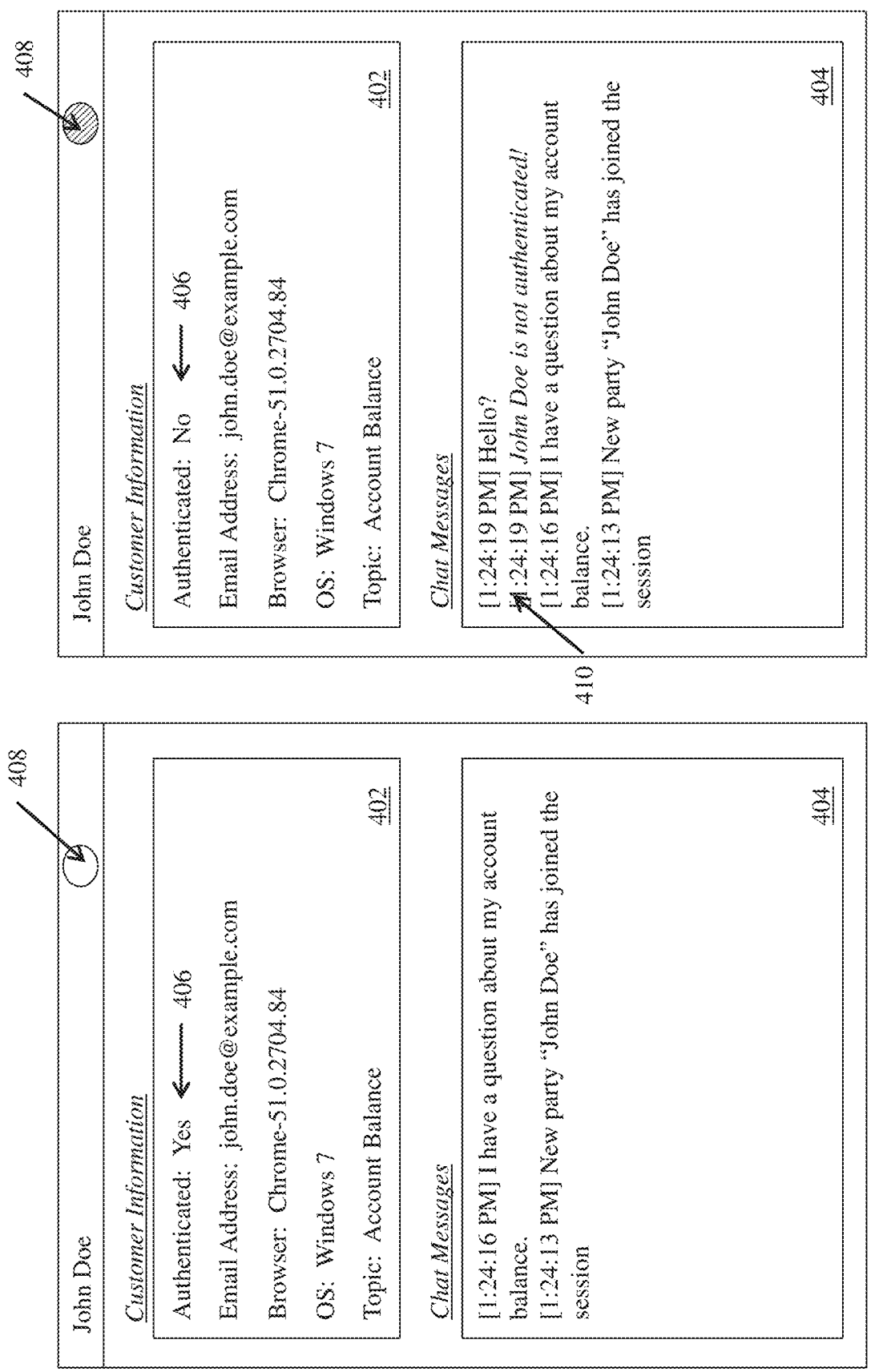
FIG. 4A depicts an exemplary chat window on a client device during an authenticated chat session.
FIG. 4B depicts an exemplary chat window on a client device during a chat session that has lost authentication.

Upon receiving the updated HTTP POST message with the appended trigger, the chat session module 108 sends (312) the message to the browser 103b at client device 102b. The browser 103b parses the message, identifies the trigger as an indication of lost authentication, and provides (314) a visual indicator to a user of client device 102b that authentication is lost. An example of such visual indication is shown in FIGS. 4A and 4B. FIG. 4A depicts an exemplary chat window on client device 102b during an authenticated chat session. The chat window includes a first area 402 to display customer information and a second area 404 to display chat messages. As shown in FIG. 4A, the chat window includes two visual indicators relating to the authentication status of the chat session: a text message 406 (e.g., "Authenticated: Yes"), and a graphical indicator 408 (e.g., a circle with a first color). These indicators provide quick and simple references for the operator of client device 102b to determine that the chat session is authenticated and sensitive information can be transmitted using the session. It should be appreciated that similar visual indicators can be displayed in the browser 103a of client device 102a using similar techniques in order to alert the user of client device 102a that authentication is lost.

When authentication is lost, the visual indicators can change to reflect the situation. FIG. 4B depicts an exemplary chat window on client device 102b during a chat session that has lost authentication. As shown in FIG. 4B, the text message visual indicator 406 has changed to read "Authentication: No" and the graphical indicator 408 has changed color (e.g., from green to red) so that the operator of client device 102b can determine that the chat session is unauthenticated and sensitive information should not transmitted using the session. In addition, the chat message area 404 is updated to include message information 410 indicating the loss of authenticated status. This can be useful for subsequent evaluation and auditing of the chat transcript for quality assurance and loss mitigation purposes.

Turning back to FIG. 3, the browser 103a at client device 102b then continues the online chat session by issuing (314) a GET request to the browser 103b at client device 102b to receive messages via the unauthenticated channel (e.g., https://www.xyz.com/chat/guest/...URL).

Figure 5:
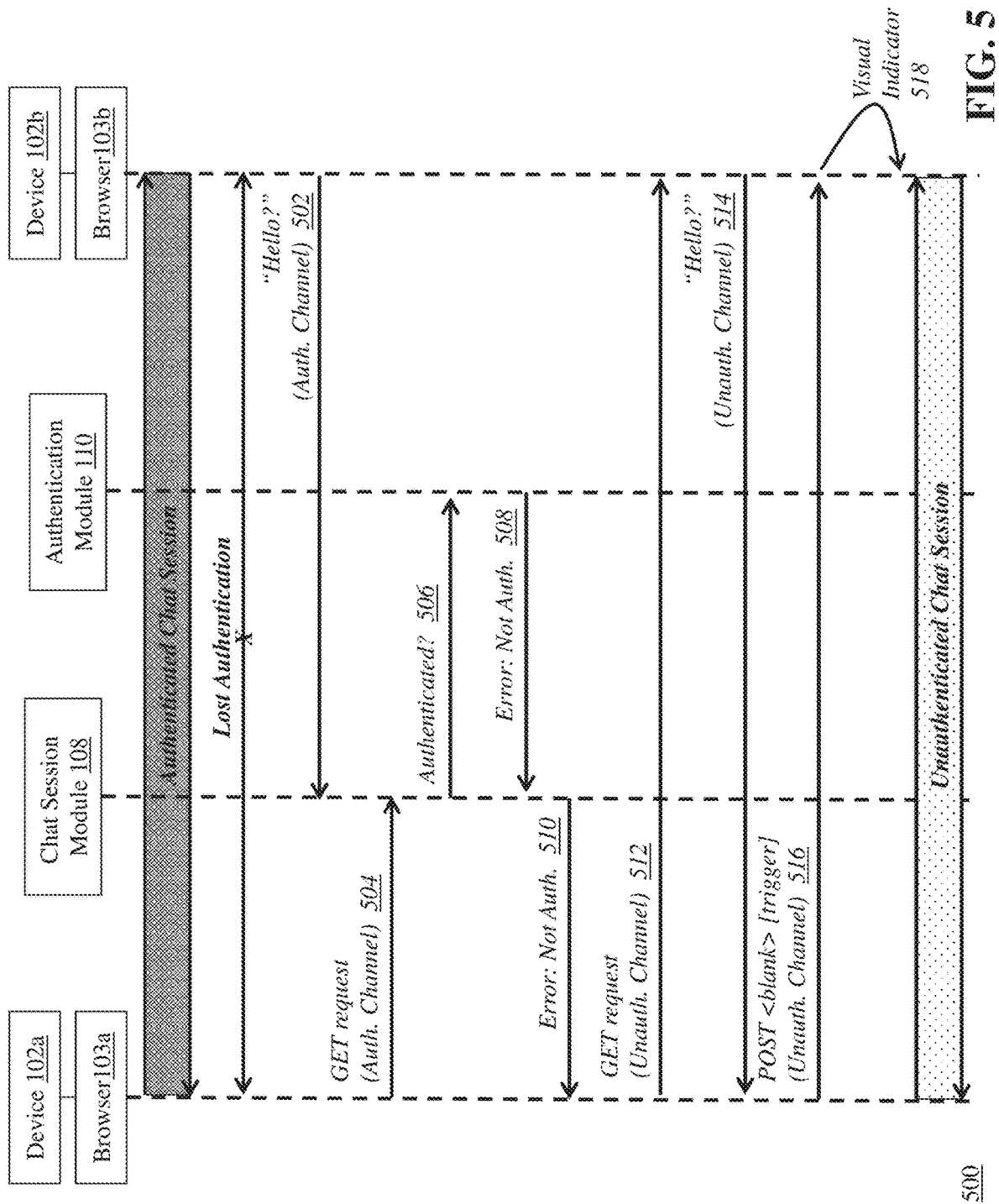
FIG. 5 is a detailed ladder diagram of a method of automatic authentication switching from an authenticated channel to an unauthenticated channel in an online chat session.

FIG. 5 is a detailed ladder diagram of a method 500 of automatic authentication switching from an authenticated channel to an unauthenticated channel in an online chat session, using the system 100 of FIG. 1, when a user at client device 102b submits a message during the online chat session. It should be appreciated that software (e.g., browser 103a) at client device 102a has previously established an online chat session with software (e.g., browser 103b) at client device 102b using an authenticated channel (e.g., https://www.xyz.com/chat/customer/...URL) via chat session module 108 and authentication module 110. During the online session, browser 103b periodically polls the chat session module 108 to determine if any messages have been received from client device 102a. At the same time, user at client device 102b can submit his or her own chat messages via browser 103b (e.g., by entering the message into a user interface window and pressing a submit button, which sends the message to the chat session module 108 via the authenticated channel).

In the example shown in FIG. 5, client device 102b has input a text message ("Hello?") into the browser 103b and submitted the message (502) to the chat session module 108 via the authenticated channel. However, the online chat session between client device 102a and client device 102b has lost authentication due to invalid authentication credentials prior to the client device 102b sending the message. The chat session module 108 receives the message from client device 102b. The browser 103a at client device 102b submits (504) a GET request via the authenticated channel (e.g., https://www.xyz.com/chat/customer/...URL) to retrieve waiting messages from client device 102b. The chat session module 108 determines (506) from the authentication module 110 that the current session has lost authentication (e.g., the authentication module 110 returns (508) an error message to the chat session module 108). In some embodiments, the error message returned by the authentication module 110 is a JSON error message, such as "{status: 100, reason: "INVALID CREDENTIALS", fsreqid: "REQ999 . . . ", AMReason: "NoFC"}.

The chat session module 108 sends (510) the error message back to the browser 103a at client device 102a. Upon receiving the error message, the browser 103a automatically switches the online chat session to use the unauthenticated channel (e.g., https://www.xyz.com/chat/guest/...URL) and resends (512) the GET request it previously sent. Upon receiving the GET request, the browser 103b at client device 102b sends (514) the "Hello?" message it previously submitted, this time using the unauthenticated channel. The browser 103a at client device 102a receives the "Hello?" message from client device 102b and submits (516) a blank HTTP POST message 516 with the trigger (e.g., "trigger: AMLOSS") as described above using the unauthenticated channel (e.g., https://www.xyz.com/chat/guest/...URL).

Upon receiving the blank POST message with the trigger, the browser 103b at client device 102b parses the message, identifies the trigger as an indication of lost authentication, and provides (518) a visual indicator to a user of client device 102b that authentication is lost. The browser 103b at client device 102b then continues the online chat session via the unauthenticated channel (e.g., https://www.xyz.com/chat/guest/...URL).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of automatic authentication switching in online chat sessions, the method comprising:
receiving, by a server computing device, a request to establish an online chat session from a first client computing device, the request including authentication credentials associated with the first client computing device;
establishing, by a server computing device, an online chat session between the first client computing device and a second client computing device via a first authenticated text communications channel after validating the authentication credentials, the first authenticated text communications channel comprising a first URL that, when activated, connects the first client computing device to the second client computing device via an authentication module at the server computing device, a portion of the first URL denoting an association with the first authenticated text communications channel, the server computing device passing the online chat session through the authentication module upon detecting the portion of the first URL denoting an association with the first authenticated text communications channel;
transmitting, by the server computing device, one or more chat messages between the first client computing device and the second client computing device using the first authenticated text communications channel;
determining, by the first client computing device, that the online chat session has lost authentication;
automatically switching, by the first client computing device, the online chat session to a second unauthenticated text communications channel, the second authenticated text communications channel comprising a second URL that, when activated, connects the first client computing device to the second client computing device without using the authentication module at the server computing device, a portion of the second URL denoting an association with the second unauthenticated text communications channel, the server computing device passing the online chat session to the second client computing device without using the authentication module upon detecting the portion of the second URL denoting an association with the second unauthenticated text communications channel; and
maintaining, by the server computing device, the established online chat session between the first client computing device and the second client computing device via the second unauthenticated text communications channel.

2. The method of claim 1, further comprising preventing, by the server computing device, one or more chat messages from being transmitted between the first client computing device and the second client computing device via the first authenticated text communications channel when the first client computing device determines that the online chat session has lost authentication.

3. The method of claim 2, wherein the one or more chat messages prevented from being transmitted between the first client computing device and the second client computing device via the first authenticated text communications channel contain sensitive information.

4. The method of claim 1, wherein the first URL includes an in-line customer identifier.

5. The method of claim 1, wherein the step of automatically switching the online chat session comprises transferring the online chat session from the first authenticated text communications channel to the second unauthenticated text communications channel and then closing the first authenticated text communications channel.

6. The method of claim 1, wherein the step of determining that the online chat session has lost authentication comprises one or more of: determining that a browser at the first client computing device has logged out of a secure website; determining that authentication associated with the online chat session has expired; and determining that a browser at the first client computing device has navigated away from a secure website.

7. The method of claim 1, wherein the first client computing device determines that the online chat session has lost authentication upon receiving an authentication error from the server computing device.

8. The method of claim 7, wherein the first client computing device generates an authentication loss chat message in response to the authentication error by appending an authentication loss trigger to a chat message and sends the authentication loss chat message to the server computing device.

9. The method of claim 7, wherein the second client computing device generates an authentication loss chat message by appending an authentication loss trigger to a chat message and sends the authentication loss chat message to the server computing device.

10. The method of claim 7, further comprising:
generating, by the server computing device, a blank authentication credential upon receiving the authentication loss chat message; and
transmitting, by the server computing device, the blank authentication credential to the second client computing device.

11. The method of claim 10, further comprising generating, by the second client computing device, a visual indicator on a display coupled to the second client computing device, the visual indicator instructing a user of the second client computing device that the online chat session has lost authentication.

12. The method of claim 1, further comprising:
instructing, by the server computing device, the first client computing device to resend the authentication credentials upon determining that the online chat session has lost authentication;
automatically switching, by the server computing device, the online chat session from the second unauthenticated text communications channel to the first authenticated text communications channel upon validating the resent authentication credentials; and
maintaining, by the server computing device, the established online chat session between the first client computing device and the second client computing device via the first authenticated text communications channel.

13. A system for automatic authentication switching in online chat sessions, the system comprising:
a first client computing device;
a second client computing device; and
a server computing device,
wherein the server computing device:
receives a request to establish an online chat session from the first client computing device, the request including authentication credentials associated with the first client computing device;

establishes an online chat session between the first
  client computing device and the second client computing device via a first authenticated text communications channel after validating the authentication credentials, the first authenticated text communications channel comprising a first URL that, when activated, connects the first client computing device to the second client computing device via an authentication module at the server computing device, a portion of the first URL denoting an association with the first authenticated text communications channel, the server computing device passing the online chat session through the authentication module upon detecting the portion of the first URL denoting an association with the first authenticated text communications channel;

transmits one or more chat messages between the first client computing device and the second client computing device using the first authenticated text communications channel; and wherein the first client computing device:

determines that the online chat session has lost authentication; and automatically switches the online chat session to a second unauthenticated text communications channel, the second authenticated text communications channel comprising a second URL that, when activated, connects the first client computing device to the second client computing device without using the authentication module at the server computing device, a portion of the second URL denoting an association with the second unauthenticated text communications channel, the server computing device passing the online chat session to the second client computing device without using the authentication module upon detecting the portion of the second URL denoting an association with the second unauthenticated text communications channel;

wherein the server computing device maintains the established online chat session between the first client computing device and the second client computing device via the second unauthenticated text communications channel.

14. The system of claim 13, wherein the server computing device prevents one or more chat messages from being transmitted between the first client computing device and the second client computing device via the first authenticated text communications channel when the first client computing device determines that the online chat session has lost authentication.

15. The system of claim 14, wherein the one or more chat messages prevented from being transmitted between the first client computing device and the second client computing device via the first authenticated text communications channel contain sensitive information.

16. The system of claim 13, wherein the first URL includes an in-line customer identifier.

17. The system of claim 13, wherein automatically switching the online chat session comprises transferring the online chat session from the first authenticated text communications channel to the second unauthenticated text communications channel and then closing the first authenticated text communications channel.

18. The system of claim 13, wherein determining that the online chat session has lost authentication comprises one or more of: determining that a browser at the first client computing device has logged out of a secure website; determining that authentication associated with the online chat session has expired; and determining that a browser at the first client computing device has navigated away from a secure website.

19. The system of claim 13, wherein the first client computing device determines that the online chat session has lost authentication upon receiving an authentication error from the server computing device.

20. The system of claim 19, wherein the first client computing device generates an authentication loss chat message by appending an authentication loss trigger to a chat message and sends the authentication loss chat message to the server computing device.

21. The system of claim 19, wherein the second client computing device generates an authentication loss chat message by appending an authentication loss trigger to a chat message and sends the authentication loss chat message to the server computing device.

22. The system of claim 19, wherein the server computing device:

generates a blank authentication credential upon receiving the authentication loss chat message; and transmits the blank authentication credential to the second client computing device.

23. The system of claim 22, wherein the second client computing device generates a visual indicator on a display coupled to the second client computing device, the visual indicator instructing a user of the second client computing device that the online chat session has lost authentication.

24. The system of claim 13, wherein the server computing device:

instructs the first client computing device to resend the authentication credentials upon determining that the online chat session has lost authentication;

automatically switches the online chat session from the second unauthenticated text communications channel to the first authenticated text communications channel upon validating the resent authentication credentials; and maintains the established online chat session between the first client computing device and the second client computing device via the first authenticated text communications channel.

25. A computer program product, tangibly embodied in a non-transitory computer readable storage device, for automatic authentication switching in online chat sessions, the computer program product including instructions that, when executed, cause:

a server computing device to:

receive a request to establish an online chat session from a first client computing device, the request including authentication credentials associated with the first client computing device;

establish an online chat session between the first client computing device and a second client computing device via a first authenticated text communications channel after validating the authentication credentials, the first authenticated text communications channel comprising a first URL that, when activated, connects the first client computing device to the second client computing device via an authentication module at the server computing device, a portion of the first URL denoting an association with the first authenticated text communications channel, the server computing device passing the online chat session through the authentication module upon detecting the portion of the first URL denoting an association with the first authenticated text communications channel;

transmit one or more chat messages between the first client computing device and the second client computing device using the first authenticated text communications channel; and the instructions, when executed, cause the first client computing device to:

determine that the online chat session has lost authentication; and automatically switch the online chat session to a second unauthenticated text communications channel, the second authenticated text communications channel comprising a second URL that, when activated, connects the first client computing device to the second client computing device without using the authentication module at the server computing device, a portion of the second URL denoting an association with the second unauthenticated text communications channel, the server computing device passing the online chat session to the second client computing device without using the authentication module upon detecting the portion of the second URL denoting an association with the second unauthenticated text communications channel;

wherein the server computing device maintains the established online chat session between the first client computing device and the second client computing device via the second unauthenticated text communications channel.

* * * * *